United States Patent
Bauer

(10) Patent No.: US 10,446,057 B2
(45) Date of Patent: Oct. 15, 2019

(54) WELDING SPEED SENSOR

(71) Applicant: REALITYWORKS, INC., Eau Claire, WI (US)

(72) Inventor: Jeremiah R. Bauer, Mondovi, WI (US)

(73) Assignee: RealityWorks, Inc., Eau Claire, WI (US)

( * ) Notice: Subject to any disclaimer, the term of this patent is extended or adjusted under 35 U.S.C. 154(b) by 322 days.

(21) Appl. No.: 15/511,819

(22) PCT Filed: Sep. 18, 2015

(86) PCT No.: PCT/US2015/050831
§ 371 (c)(1),
(2) Date: Mar. 16, 2017

(87) PCT Pub. No.: WO2016/044679
PCT Pub. Date: Mar. 24, 2016

(65) Prior Publication Data
US 2017/0249857 A1 Aug. 31, 2017

Related U.S. Application Data

(60) Provisional application No. 62/052,795, filed on Sep. 19, 2014.

(51) Int. Cl.
| G09B 19/24 | (2006.01) |
| G01P 3/36 | (2006.01) |
| B23K 9/095 | (2006.01) |
| B23K 9/32 | (2006.01) |

(52) U.S. Cl.
CPC ............ G09B 19/24 (2013.01); B23K 9/0953 (2013.01); B23K 9/0956 (2013.01); B23K 9/32 (2013.01); G01P 3/36 (2013.01)

(58) Field of Classification Search
CPC ....... B23L 9/0956; B23K 9/32; B23K 9/0953; B23K 31/02; G09B 19/24; G09B 19/00; G09B 5/02; G01P 3/36; G01P 3/38; G06F 3/0346; G06F 3/016; G03F 3/167
See application file for complete search history.

(56) References Cited

U.S. PATENT DOCUMENTS

| 3,849,908 A | 11/1974 | Sturgeon |
| 3,867,769 A | 2/1975 | Schow et al. |
| 4,124,944 A | 11/1978 | Blair |
| 4,132,014 A | 1/1979 | Schow |
| 4,399,346 A * | 8/1983 | Kearney .............. B23K 9/0956 219/124.34 |
| 4,471,207 A | 9/1984 | Hawkes |
| 4,680,014 A | 7/1987 | Paton et al. |
| 4,689,021 A | 8/1987 | Vasiliev et al. |
| 4,716,273 A | 12/1987 | Paton et al. |

(Continued)

FOREIGN PATENT DOCUMENTS

| EP | 0963744 A1 | 12/1999 |
| JP | 6294603 A | 10/1994 |

(Continued)

*Primary Examiner* — Sang H Nguyen
(74) *Attorney, Agent, or Firm* — Sherrill Law Offices, PLLC

(57) ABSTRACT

A system (10) and method for determining welding speed employing a series of optical sensors (28) positioned along a weld joint (12) that collects light source location data during an actual weld.

20 Claims, 7 Drawing Sheets

(56) References Cited

U.S. PATENT DOCUMENTS

| | | | |
|---|---|---|---|
| 4,931,018 A | 6/1990 | Herbst et al. | |
| 5,329,091 A | 7/1994 | Bissinger | |
| 5,464,957 A | 11/1995 | Kidwell et al. | |
| 5,543,600 A * | 8/1996 | Ozamoto | B23K 9/127 219/124.34 |
| 5,679,272 A * | 10/1997 | Aderhold | B23K 11/063 219/64 |
| 5,708,253 A | 1/1998 | Bloch et al. | |
| 6,242,711 B1 | 6/2001 | Cooper | |
| 6,583,386 B1 | 6/2003 | Ivkovich | |
| 6,627,850 B1 * | 9/2003 | Koga | B23K 9/0956 219/137 PS |
| 6,734,393 B1 | 5/2004 | Friedl et al. | |
| 6,909,066 B2 | 6/2005 | Zheng et al. | |
| 6,953,917 B2 | 10/2005 | Chenault | |
| 7,150,047 B2 | 12/2006 | Fergason | |
| 7,298,535 B2 | 11/2007 | Kuutti | |
| 7,817,162 B2 | 10/2010 | Bolick et al. | |
| 7,839,416 B2 | 11/2010 | Ebensberger et al. | |
| 7,839,417 B2 | 11/2010 | Ebensberger et al. | |
| 7,962,967 B2 | 6/2011 | Becker et al. | |
| 8,075,314 B2 | 12/2011 | Cabrera | |
| 8,115,138 B2 | 2/2012 | Jacovetty et al. | |
| 8,144,193 B2 | 3/2012 | Melikian et al. | |
| 8,255,190 B2 | 8/2012 | Hala et al. | |
| 8,274,013 B2 | 9/2012 | Wallace | |
| 8,296,240 B2 | 10/2012 | Read | |
| 8,316,462 B2 | 11/2012 | Becker et al. | |
| 8,457,949 B2 | 6/2013 | Huh | |
| 8,569,655 B2 | 10/2013 | Cole | |
| 2003/0000931 A1 | 1/2003 | Ueda et al. | |
| 2003/0182178 A1 | 9/2003 | D'Elena et al. | |
| 2005/0252897 A1 | 11/2005 | Hsu et al. | |
| 2006/0136183 A1 | 6/2006 | Choquet | |
| 2006/0263752 A1 | 11/2006 | Moore | |
| 2007/0114215 A1 | 5/2007 | Bill | |
| 2008/0038702 A1 | 2/2008 | Choquet | |
| 2008/0076098 A1 | 3/2008 | Kellet | |
| 2008/0078811 A1 | 4/2008 | Hillen et al. | |
| 2008/0314887 A1 | 12/2008 | Stoger et al. | |
| 2009/0231423 A1 | 9/2009 | Becker et al. | |
| 2009/0298024 A1 | 12/2009 | Batzler et al. | |
| 2010/0048273 A1 | 2/2010 | Walalce et al. | |
| 2010/0062405 A1 | 3/2010 | Zboray et al. | |
| 2010/0062406 A1 | 3/2010 | Zboray et al. | |
| 2010/0073363 A1 | 3/2010 | Densham et al. | |
| 2010/0223706 A1 | 9/2010 | Becker et al. | |
| 2010/0224610 A1 | 9/2010 | Wallace | |
| 2011/0006047 A1 | 1/2011 | Penrod et al. | |
| 2011/0083241 A1 | 4/2011 | Cole | |
| 2011/0114616 A1 | 5/2011 | Albrecht | |
| 2011/0117527 A1 | 5/2011 | Conrardy et al. | |
| 2011/0156989 A1 | 6/2011 | Huh | |
| 2011/0183304 A1 | 7/2011 | Wallace et al. | |
| 2011/0251838 A1 | 10/2011 | Huh | |
| 2012/0035986 A1 | 2/2012 | Jimenez | |
| 2012/0122062 A1 | 5/2012 | Yang et al. | |
| 2012/0189993 A1 | 7/2012 | Kinding et al. | |
| 2012/0291172 A1 | 11/2012 | Wills et al. | |
| 2013/0040270 A1 | 2/2013 | Albrecht | |
| 2013/0206740 A1 | 8/2013 | Pfeifer et al. | |
| 2013/0206741 A1 | 8/2013 | Pfeifer et al. | |
| 2014/0183176 A1 | 7/2014 | Hutchison et al. | |
| 2014/0263224 A1 | 9/2014 | Becker | |
| 2016/0089751 A1 * | 3/2016 | Batzler | B23K 9/1087 219/125.1 |
| 2016/0260261 A1 * | 9/2016 | Hsu | G06T 1/20 |
| 2016/0267806 A1 * | 9/2016 | Hsu | G09B 19/24 |

FOREIGN PATENT DOCUMENTS

| | | |
|---|---|---|
| JP | 2001071140 A | 3/2001 |
| JP | 2004090041 A | 3/2004 |
| JP | 2005309525 A | 11/2005 |
| JP | 2011167756 A | 9/2011 |
| WO | 2004/057554 A2 | 7/2004 |
| WO | 2008/151393 A1 | 12/2008 |
| WO | 2010/020867 A2 | 2/2010 |
| WO | 2010/101683 A1 | 9/2010 |
| WO | 2011/097035 A2 | 8/2011 |
| WO | 2011/126571 A1 | 10/2011 |
| WO | 2013/008235 A2 | 1/2013 |

* cited by examiner

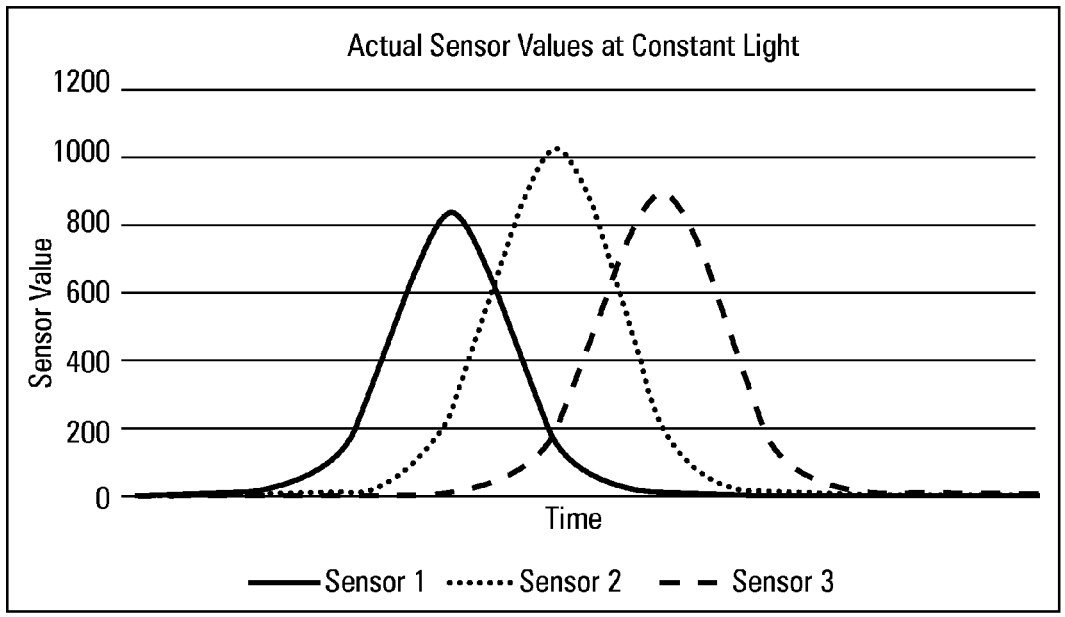

Fig. 4

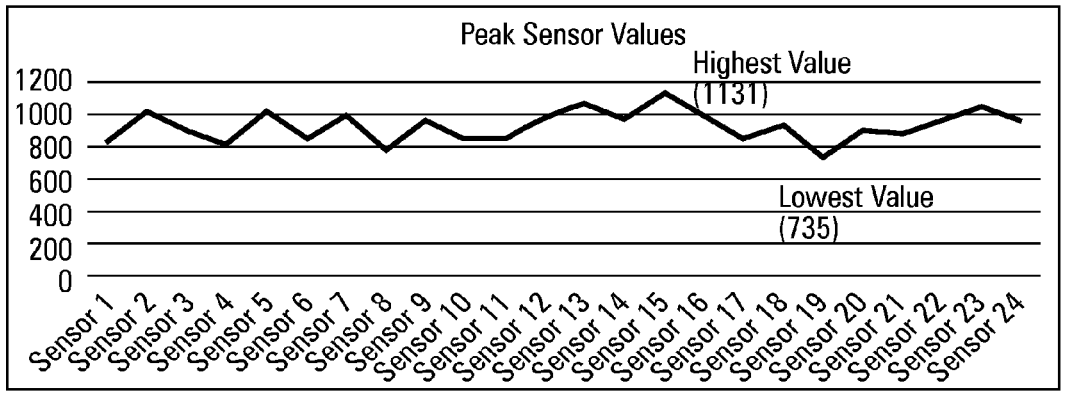

Fig. 5

*Normalized Sensor Value = Raw Sensor Value ∗ normalization factor*

Where: Normalized Sensor Value = sensor value after compensation for sensor variation
Raw Sensor Value = sensor value without any compensation
normalization factor = the multiplier for the $k^{th}$ sensor in the array to normalize its magnitude to that of the least sensitive sensor in the array

Fig. 6

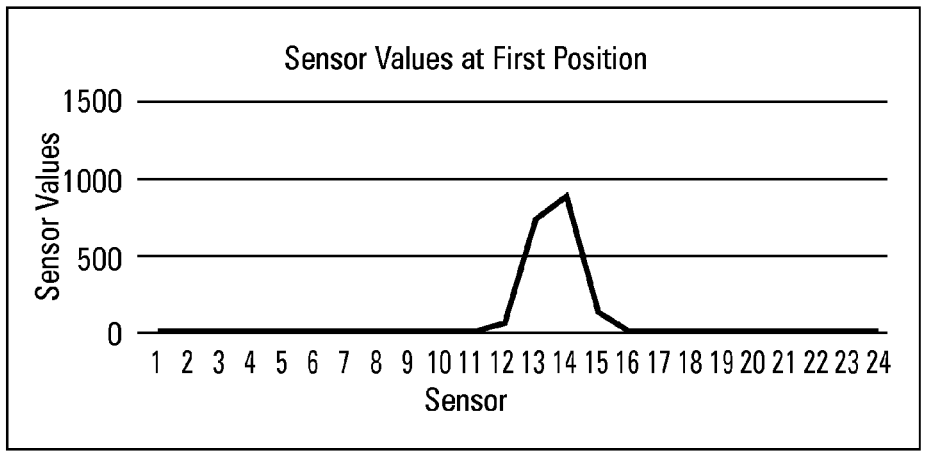

Fig. 7

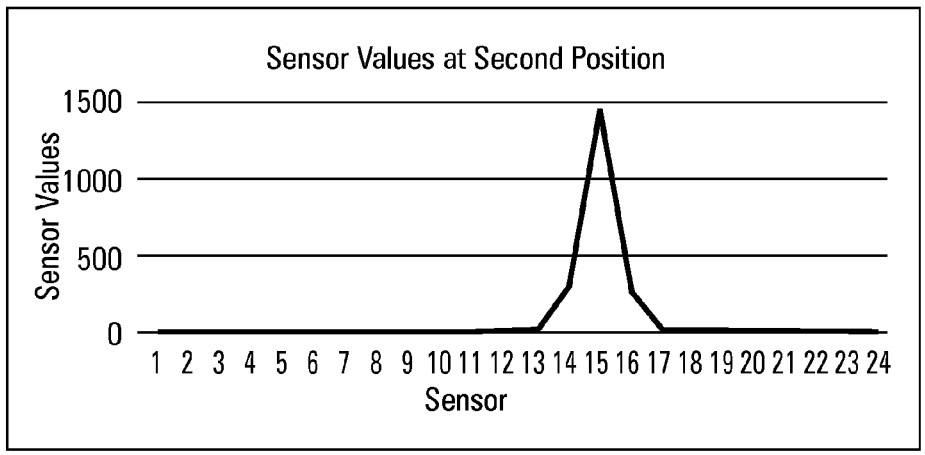

Fig. 8

$$Position = \frac{\sum_{k=1}^{n} sensor\ value(k) * normalization\ factor(k) * position(k)}{\sum_{k=1}^{n} sensor\ value(k) * normalization\ factor(k)}$$

Where: position = location of the light source along the array of sensors
        n = the number of sensors in the array
        sensor value(k) = the reading on the $k^{th}$ sensor in the array
        normalization factor(k) = the multiplier for the $k^{th}$ sensor in the array to normalize its magnitude to that of the least sensitive sensor in the array
        position(k) = the location of the $k^{th}$ sensor in the array

Fig. 9

WELDING SPEED SENSOR

BACKGROUND

This invention relates to the use of optical sensors to detect and calculate the position and speed of a welding arc during a live welding operation.

There are several methods that have been used to attempt to calculate the position and/or speed of a welding arc or welding puddle during a live welding operation. These take multiple forms including sensors that are part of the helmet, a welding gun or welding tool, the welding machine, set off to one side of the work area, or mounted to the ceiling, and utilize technologies including among others infrared tracking, RF, electromagnetic, and optical sensing.

Welding sensors that are mounted to the welding gun are not generally capable of tracking speed without interacting with separate sensors in the nearby vicinity. Welding gun, as used herein, includes wire feed welding guns, as well as SMAW welding rod holders and other hand held welding tools. These sensors act as signal transmitters or receivers that spatially locate or track the welding gun.

Some welding sensing applications mount sensors to the ceiling of the work area, or to a pedestal or fixture. These embodiments are not easily portable, and require materials be brought to a specific work area to be welded. This setup excludes welding activity that must be done outdoors, or welds performed by a welder who is not bound to a single work area, who must bring their equipment with them to a job site.

There exists a need for a system that can sense and calculate the position and speed of a live welding arc during a live welding operation, where such system is portable, easy to use, and quick to assemble and disassemble.

SUMMARY

This invention is a system for using optical sensors to detect and calculate the position and speed of a welding arc during a live welding operation. This system senses the light emitted by the welding arc itself without requiring additional markers, emitters, transmitters, or other hardware attached to the welding gun. This results in complete freedom of movement and natural feel of the welding gun for the welder, as well as simplifies the installation and usage process.

There are a number of challenges that must be overcome to realize a working system. First, the sensors themselves are usually not uniform, and can provide varying results for the same incident light. Therefore the sensors should be calibrated so that sensor data can be normalized. This can be done by exposing each sensor to the same light source, reading sensor values, determining the lowest sensor value, calculating a normalization factor for each sensor to adjust their values to the lowest sensor value, and saving these normalization factors for later use.

Second, an algorithm should be developed for converting the series of sensor data into a time and position data point. This can be done by performing a weighted average of the sensor values against their relative position.

Third, an additional calibration step can compensate for manufacturing variances in sensor location and alignments. This can be done by sensing and calculating positions (a sensed position) at a number of fixed, known positions (real position), and creating a database from which we can pull the real position for any sensed position, or interpolate between known positions if needed.

Fourth, a spark-rejection algorithm can compensate for the volatile nature of the weld puddle being observed, to avoid skewing position and speed data with undesired outliers. This can be done by understanding the typical shape of the sensor data, comparing each series of sensor data against that expected shape, and rejecting series that do not conform to it.

Fifth, a speed calculation algorithm can convert the time and position data points into a usable speed value. While a speed calculation is ultimately a change in position divided by a change in time, additional filtering of the data is required to provide a smooth speed dataset that can be useful to the welder or the welder's supervisor or instructor. Speed data that is too narrow of scope or that has been filtered too much loses value, as it is either too fleeting or too late to be used for corrective purposes.

BRIEF DESCRIPTION OF THE DRAWINGS

FIG. 4 is an exemplary chart of actual sensor values from a constant, moving light source.

FIG. 5 is an exemplary chart of actual peak sensor values from a constant light source.

FIG. 6 is a sensor normalization equation.

FIG. 7 is an exemplary chart of actual sensor values at a first position.

FIG. 8 is an exemplary chart of actual sensor values at a second position.

FIG. 9 is a position equation.

DETAILED DESCRIPTION OF THE INVENTION

| Nomenclature Table | |
|---|---|
| REF. NO. | NAME |
| 10 | Speed Sensor |
| 11 | Weldment |
| 12 | Weld Joint |
| 13 | Welding Gun |
| 14 | Welder (person) |
| 20 | Frame |
| 21 | Sensor Housing |
| 22 | Visual Indicator |
| 23 | Battery Cover |
| 24 | Power Switch |
| 25 | Weld Bead |
| 26 | Active Weld Puddle |
| 27 | Sensor Field of View |
| 28 | Sensor |
| 29 | Datum |
| 30 | Power Connector |
| 31 | Battery Charging Circuit |
| 32 | Battery |
| 33 | Voltage Regulator Circuit |
| 34 | Microcontroller |

-continued

Nomenclature Table

| REF. NO. | NAME |
|---|---|
| 35 | Wireless Communication Module |
| 36 | Electronic Memory |
| 37 | Wired Communication Module |
| 38 | Second Microcontroller |
| 39 | Filter |

Definitions

As utilized herein the phrase "set of light intensity measurements" means a set of normalized light intensity measurements taken simultaneously by each light intensity sensor in a series of light intensity sensors on a light source locator or a light source travel speed sensor according to this invention.

As utilized herein the phrase "light intensity distribution graph" means a line graph of normalized light intensity measurements taken simultaneously by each light intensity sensor in a series of light intensity sensors, plotted against the lateral location of each light intensity sensor. Position here refers to a location along the array of sensors. Since in operation, the array of sensors is parallel to the weld joint, the position of the arc along the weld joint is directly analogous and equivalent to a position along the sensors directly above the weldment. "Position" may refer to either the location of the weld puddle and arc on the weldment, or to the corresponding point on the array.

As utilized herein the term "datum" means a starting point for position, or rather the "zero location."

As utilized herein the phrase "normalization factor" means a multiplier for a sensor in the sensor array that normalizes or equalizes its values such that peak intensity at each sensor is equal to the other sensors in the array.

As utilized herein the phrase "sensed position" means a position value calculated from normalized sensor data.

As utilized herein the phrase "real position" means the actual real world position for a corresponding sensed position.

Construction

Figure 1:
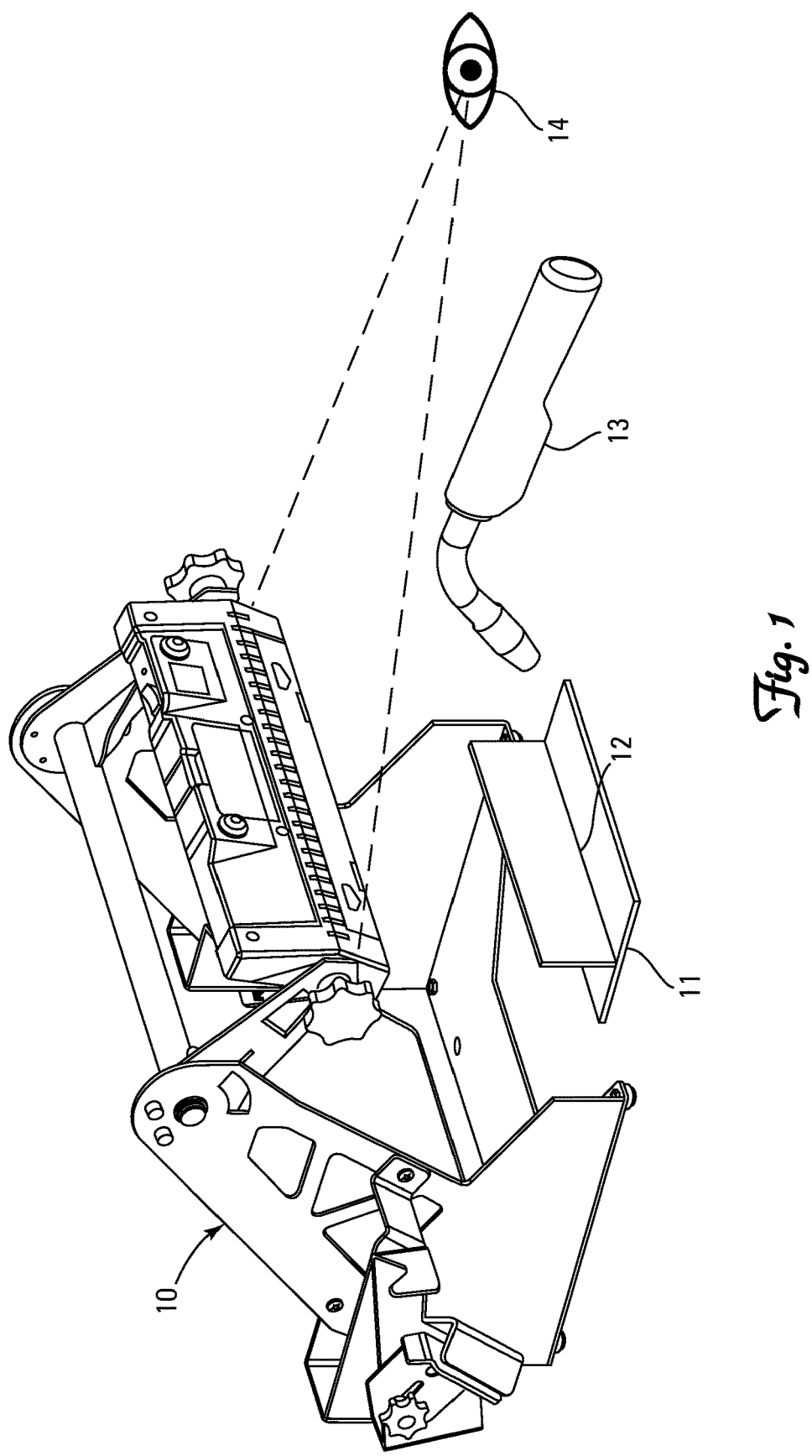
FIG. 1 is a perspective view of one embodiment of the invention.

The speed sensor 10 can be used in active welding environments. FIG. 1 describes a typical welding environment, where the speed sensor 10 will be positioned next to a weldment 11 such that its sensors are able to observe the weld joint 12 without any interference from the welding gun 13 or the welder 14. In this configuration, the welder 14 will be able to observe the weldment 11 and perform the weld without being impaired by the speed sensor 10 or any other welding gun attachments or accessories.

Figure 2:
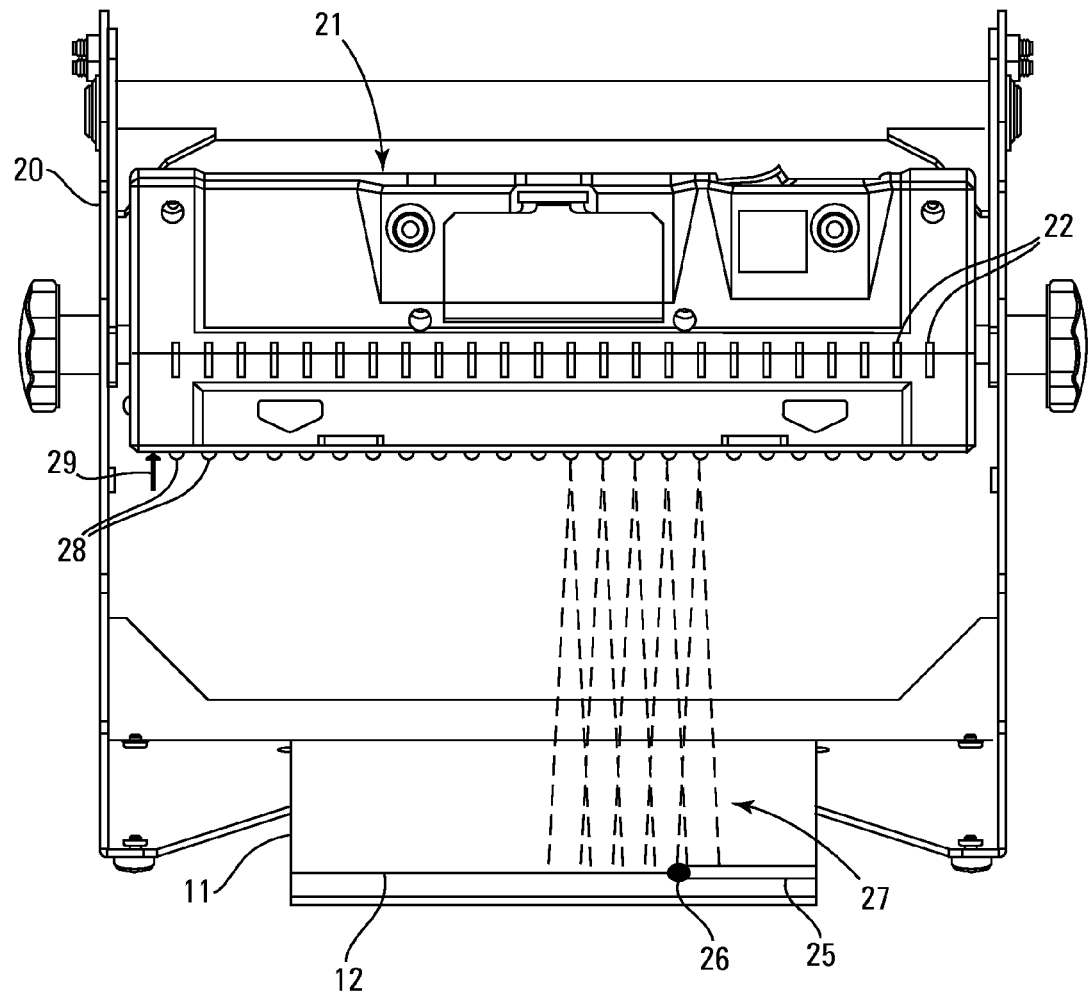
FIG. 2 is a front view of the invention depicted in FIG. 1.

FIG. 2 describes the structure of a preferred embodiment of a welding speed sensor 10. A frame 20 provides structural support for a sensor housing 21 that contains an electronics assembly. The speed sensor 10 electronics assembly is further described in FIG. 3. The electronics assembly is powered by a battery 32 accessible through a battery cover 23 in the housing, though other embodiments could be powered from a desktop power supply or a solar charging system that draws power from welding activity light emissions. A power switch 24 is provided to activate the system during use, and to disconnect the batteries or alternative power supply during non-use to conserve power. Visual indicators 22 are located on the side of the housing that faces the user. These indicators can provide feedback that may include on or more of on/off status, operating mode, position information, or speed information.

The electronics assembly contains a series of sensors 28 connected electrically to a microcontroller 34, such that the microcontroller 34 is able to retrieve a sensor value from each individual sensor that correlates to the amount of light incident upon it. In the embodiment shown in FIG. 2, the frame 20 positions the sensors in the housing directly above the weld joint 12 on the weldment 11. In this embodiment, twenty four sensors 28 are spaced every half inch along the bottom of the housing. These sensors each have a field of view 27 of the area directly beneath them. These fields of view can overlap, such that light emitted from an active weld puddle 26 can be picked up in varying amounts by at least one sensor. As the welder 14 performs the weld, a weld bead 25 builds up along the weld joint 12. The weld bead 25 cools rapidly as the active weld puddle 26 progresses, such that the light emitted by the active weld puddle 26 is significantly larger than the light emitted by the cooling weld bead 25. Light is generally emitted from both the active weld puddle 26 as well as the arc between the wire or welding gun 13 contact and the weld puddle 26. In this description, arc and puddle 26 are used interchangeably as the light source. From the perspective of welding travel speed, the speed of either the puddle 26 or the arc is equivalent to the desired speed.

A datum 29 or zero location is identified on FIG. 2, identifying a nominal starting point for position calculations to be further described shortly. The datum 29 is somewhat arbitrary, as the absolute position is not critical for calculating speed, but rather the CHANGE in position is important. In the preferred embodiment, a datum 29 approximately 0.25 inches to the left of the sensor marked 28 in FIG. 2 is used.

Figure 3:
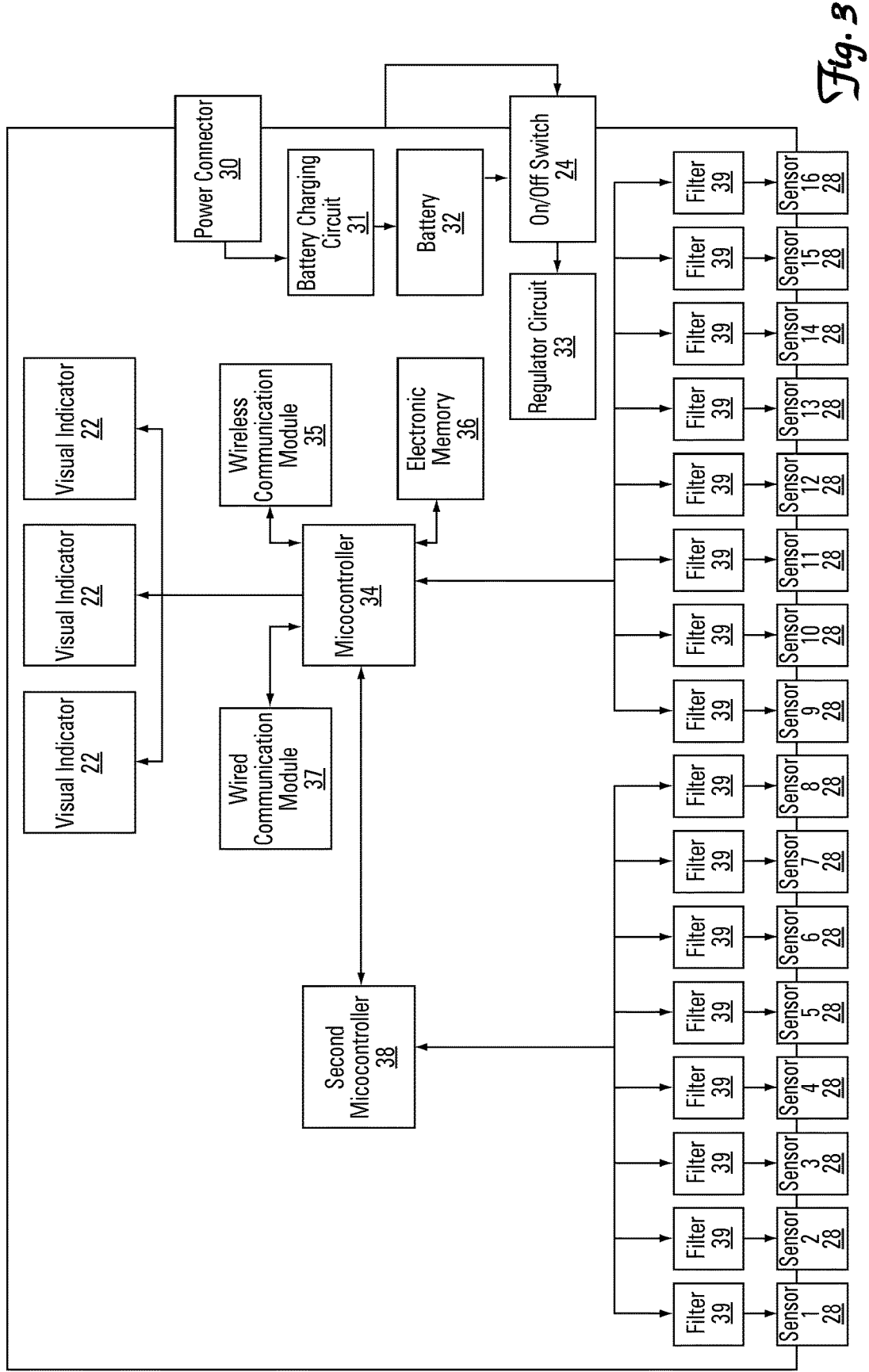
FIG. 3 is a functional block diagram of one embodiment of a speed sensor electronics assembly of the invention.

FIG. 3 describes the elements of a preferred speed sensor 10 electronics assembly in more detail. In the preferred embodiment, a rechargeable battery 32 provides power to the system. This battery 32 could be one or more individual rechargeable cells, one or more rechargeable battery cells in a battery pack, or one or more primary cells such as a pair of Alkaline AA batteries. A power connector 30 would receive regulated DC voltage from a desktop power supply, providing power to a battery charging circuit 31 for use with rechargeable cells. Battery 32 or regulated DC voltage is then regulated into a system voltage by the regulator circuit 33 to provide stable power to the rest of the electronics assembly. These circuits are all well known in the electronics industry, and many possible variations are possible without affecting the intent of this invention.

The series of sensors 28 are electrically connected to the microcontroller 34 such that the microcontroller 34 can read the light intensity at each sensor 28. These optical sensors 28 could be a phototransistor, such as a Vishay TEFT4300, which senses light at a 925 nm wavelength at approximately a 60 degree viewing angle. The preferred embodiment has been optimized to work with the TEFT4300, though other light sensor types, wavelengths, and viewing angles may be used with appropriate changes to filtering and processing equations.

A filter 39 may be used in-line between each sensor 28 and the microcontroller 34 to condition the signal and remove unwanted noise. This noise can occur from such sources as the rapid variation in light intensity from the flashing arc light, or from reflections of light off other surfaces. This filter 39 could be as simple as an RC network, to create a low-pass filter 39 to smooth the signal. This technology and signal smoothing technique is well known among those skilled in the art.

In some cases, depending primarily upon the number of sensors 28 required, one or more additional microcontrollers 34 may be required to read additional sensors 28 to ensure that all sensors 28 are read nearly instantaneously. Nearly instantaneous reading of the sensors 28 is desired because of the rapidly changing nature of the light intensity being observed. If a single microcontroller 34 has to read sixteen sensors 28 sequentially for example, and each sensor 28 reading takes the microcontroller 34 two microseconds to complete, the light being observed could be significantly different while reading the sixteenth sensor 28 than it was during the first sensor 28 thirty two microseconds earlier. Having multiple microcontrollers 34 reading different banks or groups of sensors 28 can result in a quicker overall read time and approach the ideal "instantaneous" goal. In the case of two or more microcontrollers 34, one should play the role of a master, and signal to the other microcontroller(s) 34 that it was time to read the sensors 28. All microcontrollers 34 would read the sensor values from their respective sensors 28. The second microcontroller 34 would then electrically communicate the sensor values it had read to the first for final processing. Again, one skilled in the art of electronic design would be capable of effecting electrical interconnection and common control of multiple microcontrollers 34 for controlling separate groups of sensors 28.

In the system shown in FIG. 3, the microcontroller 34 would play the role of the master, sending the synchronization signal to the second microcontroller 38 when it was time to perform a read. Both microcontrollers would read their eight respective sensors 28 and store them in onboard RAM. The master microcontroller 34 would then request the values for sensor one $28_1$ through sensor eight $28_8$ from the second microcontroller 38, which would be communicated electrically through a UART connection between the two microcontrollers (34 and 38). The microcontroller 34 could then process the sensor data into a position and ultimately a speed value as described in the remainder of this detailed description.

The microcontroller 34 could also be electrically connected to the visual indicators 22 that are visible to the user and provide information to them such as on/off status, operating mode, position information, or speed information. These visible indicators may be discrete LEDs, LED bars, or an LCD screen containing text and graphic information.

The microcontroller 34 may also be electrically connected to an electronic memory 36 component, such as an EEPROM or a serial flash IC. This memory 36 can be used to store calibration data such as sensor high and low values and sensor normalization factors. This memory 36 could also store diagnostic or troubleshooting information such as total run time, results of diagnostic tests, or abnormal operation timestamps and state details. This memory 36 could also store historical performance data, including data such as observed speeds or comparisons between observed and desired speeds.

The microcontroller 34 may also be electrically connected to a wireless communication module 35 and/or a wired communication module 37 to facilitate communication with the end user or other parts of a welding sensing, tracking, or training system. The wireless communication module 35 could be a Bluetooth radio, a WiFi radio, an 802.15.4 radio, or other suitable wireless interface. The wired communication module 37 could be a USB connector and a USB-to-UART serial converter IC, or with many microcontrollers available today, simply a USB connector electrically connected to a microcontroller with built in USB capability. The wired communication module 37 could also utilize another type of wired protocol, such as RS-232 or a RS-485. Both communication 35 and 37 modules serve the same purpose of providing a means for the welding speed sensor 10 to receive commands (start, stop, reset, etc) or data (configuration data, calibration data, firmware updates) or to send commands (synchronizing with other tools in a system) or data (observed speeds, observed positions, raw data, historical data, real-time data, etc.).

To get an accurate, consistent position measurement and calculation, the sensor values should be normalized. In the ideal case, each sensor 28 would return the same value for the same amount of incident light. One approach to removing this variable from the method is to bin the components by testing each sensor 28 at a specific light intensity, compare its sensed value against an expected value or range of values, and group or bin it with other sensors 28 of similar sensitivity. Only sensors 28 of similar sensitivity would then be populated onto the same electronics assembly.

Another approach to compensate for sensor 28 sensitivity variation is by moving a constant light source past each sensor 28 at a slow enough speed that the processor can gather enough data points to fully characterize the sensor curve, as exemplified in FIG. 4. This chart shows the actual sensor values from three consecutive sensors in the array. The output from the first sensor $28_1$ is shown by the solid line, with a peak of 840. Sensor values as used in this description are unit-less and simply shows relative magnitudes from one sensor 28 to the next. The techniques described herein work with these unit-less values, but would also work with sensor values directly tied to a physical property such as light intensity (mW/cm$^2$, for example) or voltage.

As demonstrated in FIG. 4, the raw or actual sensor values for three sensors are displayed. Sensor one $28_1$ is represented by a solid line, sensor two $28_2$ by a dotted line, and sensor three $28_3$ by a dashed line. They each demonstrate the same shape of curve, with a negligible magnitude before the light source begins coming into view, rising linearly as the incident light increases, peaking, and then falling linearly as the light source moves gradually out of view. Sensor one $28_1$ peaks at 840, sensor two $28_2$ at 1030, and sensor three $28_3$ at 900. This can cause error in position calculations, as a value of 840 for sensor one $28_1$ represents the peak or maximum intensity (suggesting the light source is directly below the sensor $28_1$) whereas a value of 840 on sensor two $28_2$ represents only 82% of the peak (suggesting the light source is not yet beneath the sensor $28_2$).

Another way to look at this variation can be found in FIG. 5, which depicts peak sensor values for an exemplary series of twenty four sensors 28. In this one instance, peaks varied from a low of 735 to a high of 1131. There are many ways to compensate for this variation. One simple method is to apply a normalization factor that each sensor value can be multiplied by to obtain a normalized magnitude. For example, if we normalize all sensor values to that of the least sensitive sensor 28—in the case depicted in FIG. 5 it would be sensor nineteen 28 at 735—then we can obtain a flat sensor sensitivity to feed into our position algorithm. FIG. 6 shows a normalization equation, which is a normalization factor that each raw sensor value is multiplied by to get a normalized sensor value. Looking at sensor one $28_1$, this normalization factor would be 735/840 or approximately 0.875. Sensor two 28 would have a normalization factor of 735/1030 or approximately 0.714. Sensor three 28 would have a normalization factor of 735/900 or approximately 0.817. Normalizing each sensor's 28 output will result in a full range of outputs from 0 to 735, regardless of the sensitivity variations.

In the preferred embodiment, this approach is accomplished by placing a movable light a fixed distance from the sensors 28, aligned so that the direction of travel of the light is parallel to the sensors 28 keeping the distance constant for all sensors 28. The user places the speed sensor 10 into a calibration mode by sending an electronic signal through the wireless communication module 35. This causes the microcontrollers 34 and 38 to begin repeated scans of each sensor 28. The master microcontroller 34 receives the values of all sensors 28 and stores them in the electronic memory 36. Each additional set of sensor data is compared against the stored values and the stored value is replaced with the new value if the new value is higher than the stored value. When the user ends the calibration mode by sending another electronic signal to the microcontroller 34 through the wireless communication module 35, the stored values in the electronic memory 36 will contain the largest value observed for each sensor 28. This value is then used to calculate the normalization factor for each sensor 28, as described previously.

This is only one method of normalizing the sensor values. One could just as easily normalize the values to the largest value or the most sensitive sensor 28, or to the median value or average sensitivity without changing the outcome of the position calculating algorithm.

FIG. 7 shows an example of sensor readings at a first position where the light source is between the thirteenth and fourteenth sensors 28. FIG. 8 shows another example of sensor readings where the light source is directly below the fifteenth sensor 28. The light from the light source is detected by multiple sensors 28, such that a peak exists at the location of the light source, and decreasing intensities are detected by adjacent sensors 28 until the signal fades into background noise levels. In the example shown, there are significant values found on three to five sensors 28, depending on alignment. In practice, significant values could be found on more or less sensors 28, in part due to the viewing angle of the sensors 28 and the distance between the light source and the sensor array $28_n$.

If only a single sensor 28 detected the light source at any given time, the system could only infer that the light source was within that sensor's 28 field of view 27. In our preferred embodiment, with sensors 28 spaced 0.5 inches apart, this would result in a system resolution or precision of 0.5 inches. Thus, we would not be able to determine where, within that 0.5 inch window, the light source is actually located. By sensing the light source from multiple sensors 28, and then performing a weighted average calculation on the sensor values, the system can narrow down the resolution of the system to a more useful level. In the preferred embodiment the resolution could be as small as one hundredth of an inch or even finer.

FIG. 9 describes a weighted average equation used to calculate position. Position here refers to the location of the light source along the array of sensors 28. In the preferred embodiment, the twenty four sensors 28 are spaced 0.5 inches apart to provide approximately twelve inches of coverage. In practice, more or fewer sensors 28 could be used, at greater or shorter distances, to provide greater or shorter coverage. In the equation, "n" refers to the number of sensors 28, twenty four in the case of the preferred embodiment. The term "sensor value(k)" refers to the sensor value retrieved by the processor from the k$^{th}$ sensor 28 in the array. The term "normalization factor(k)" refers to the multiplier for the k$^{th}$ sensor 28 that is used to normalize the sensor 28 outputs, as described above. The term "position (k)" refers to the location of the k$^{th}$ sensor 28 in the array. In the preferred embodiment, as shown in FIG. 2, the first sensor is labeled as item 28. The datum 29 or zero location is the left edge of a 0.5 inch region in which sensor one is centered. Therefore, position one will be the location of the first sensor 28, which will be at 0.25 inches in the preferred embodiment. The location of the second sensor 28 position two, will be 0.75 inches. The position is somewhat arbitrary, and any number or reasonable datum 29 options exist. The speed calculation ultimately looks for changes in position, making the absolute position less critical.

The equation in FIG. 9 for finding position is a sum of the products of sensor value, normalization factor, and position for each sensor 28 in the array, divided by the sum of the products of sensor value and normalization factor for each sensor 28 in the array. To provide an example of how this is applied, we can look at the example data in FIG. 7. There, the first eleven sensors 28 are seeing no light. Multiplying by zero yields a product of zero, so we can ignore the first eleven sensors 28, as well as sensors seventeen 28 through twenty four. Looking at the data for sensors 28 twelve through sixteen yields the following equation:

$$\text{Position} = \frac{\left(9*\frac{735}{862}*5.25\right)+\left(72*\frac{735}{986}*5.75\right)+\left(737*\frac{735}{1069}*6.25\right)+\left(889*\frac{735}{973}*6.75\right)+\left(136*\frac{735}{1131}*7.25\right)+\left(12*\frac{736}{986}*7.75\right)}{\left(9*\frac{735}{862}\right)+\left(72*\frac{735}{986}\right)+\left(737*\frac{735}{1069}\right)+\left(889*\frac{735}{973}\right)+\left(136*\frac{735}{1131}\right)+\left(12*\frac{736}{986}\right)}$$

This reduces to a position of 6.55 inches, which is in-between sensors 28 thirteen and fourteen.

When we look at another example, as shown in FIG. 8, we get zero data for sensors 28 one through eleven, and eighteen through twenty four. We therefore only have to consider sensors 28 twelve through seventeen.

$$\text{Position} = \frac{\left(13*\frac{735}{986}*5.75\right)+\left(18*\frac{735}{1069}*6.25\right)+\left(289*\frac{735}{973}*6.75\right)+\left(1475*\frac{735}{1131}*7.25\right)+\left(264*\frac{735}{986}*7.75\right)+\left(20*\frac{736}{832}*8.25\right)}{\left(13*\frac{735}{986}\right)+\left(18*\frac{735}{1069}\right)+\left(289*\frac{735}{973}\right)+\left(1475*\frac{735}{1131}\right)+\left(264*\frac{735}{986}\right)+\left(20*\frac{736}{852}\right)}$$

This reduces to a position of 7.23 inches, which is very close to the 7.25 inch location of sensor fifteen 28.

Figure 10:
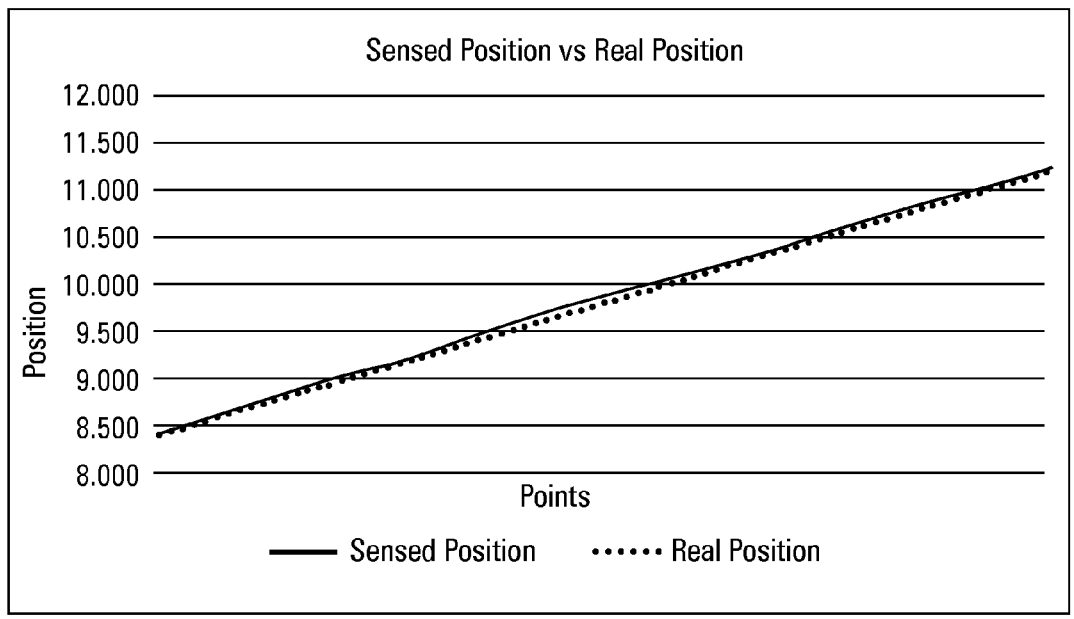
FIG. 10 is an exemplary chart of sensed position versus real position.

The system is therefore capable of translating sensor data into a calculated position, which we will call a sensed position. There are still opportunities for error caused from outside factors such as sensor alignment variation and sensor spacing errors. One method for compensating for these errors is to create a database or table of sensed positions and corresponding real positions. This is a calibration that can be done to each sensor assembly after it is manufactured to remove such variations. One method for obtaining such data is to position a light source at a series of known, fixed real positions and save the sensed positions for each point. Another method is to start a light source at a known position and move it across the sensor 28 array at a known speed, saving positions at known time intervals from which the real position can be calculated. This is demonstrated in FIG. 10, where small variances between the real position and sensed position can be observed. Regardless of which method is used, a database of sensed positions and corresponding real positions can be stored in memory 36, and used to translate a sensed position into a real position during use.

The act of welding produces a bright, light emitting puddle 26 that can be tracked using the described speed sensor 10 system. However, the act of welding also has a tendency to produce sparks which also produce light as they move rapidly away from the puddle 26. This can produce errors in sensed position if not accounted for.

Figure 11:
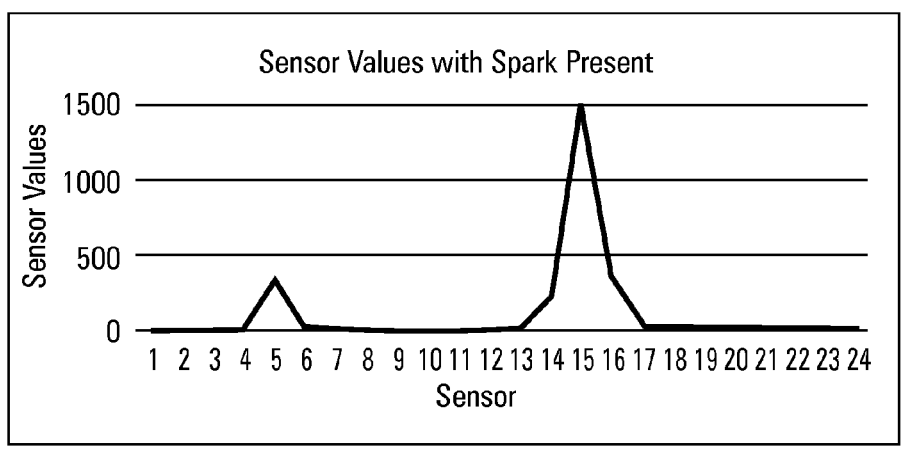
FIG. 11 is an exemplary chart of sensor values with a spark present.

FIGS. 7 and 8 depict exemplary sensor curves without a spark present. FIG. 11 depicts a sensor curve with a spark present near sensor five 28. This spark has created an unwanted value on sensor five 28 that will skew the resulting sensed position lower than where the puddle 26 is actually located. One method for filtering out outliers like this is to first determine which sensor 28 has the highest sensor value, or alternatively to use the last sensed position to estimate where the peak should be, if the new sensor values are captured after a sufficiently short timeframe 20 that the position should have not changed substantially. The system would then check sensor values from the first sensor 28 on either side of the center or peak sensor to ensure these sensor values are at least 25% of the value of the peak sensor value. If not, this could indicate a very bright spark has eclipsed the actual puddle 26 intensity and created an artificial peak. This set of sensor readings could then be rejected.

If the data set passes this first test, the sensor values for the second sensor 28 on either side of the center or peak sensor could be checked to ensure that they are less than a threshold values (e.g., 95%) of the peak. This will ensure that the curve has peaked and is beginning to drop off on both sides. If the dataset passes this test, the sensor values for the third sensor 28 on either side of the center or peak sensor 28 can be inspected to ensure they are less than a threshold value (e.g., 60%) of the peak. This continues to ensure that the curve is dropping at an expected rate. This series of checks can continue to ensure that the curve generated by the sensors 28 fits the expected shape and is not being affected by sparks or other light interference. It is of course practical to use other values for the thresholds, or to combine both a minimum and maximum threshold for any or all sensors 28, or to make other refinements to this test. The width of the curve can be impacted by the field of view of the sensors 28 and the distance from the sensor array $28_n$ to the light source, such that the resulting curve can be wider or narrower depending on configuration. The values described here in the preferred embodiment are for an optimal 8 inch distance between the sensors 28 and the light source.

At the most basic level, a speed is simply a change in position divided by a change in time, or alternatively how long does it take to move a distance. When tracking speed of a slowly moving object, such as a weld puddle 26, accuracy can be improved by looking at a greater span of time and distance. For example, at a typical welding speed of 6 inches per minute, the weld puddle 26 will only travel 0.1 inch every second. If our resolution or precision is only 0.01 inch, then trying to calculate a speed every millisecond will not yield valid results.

Figure 12:
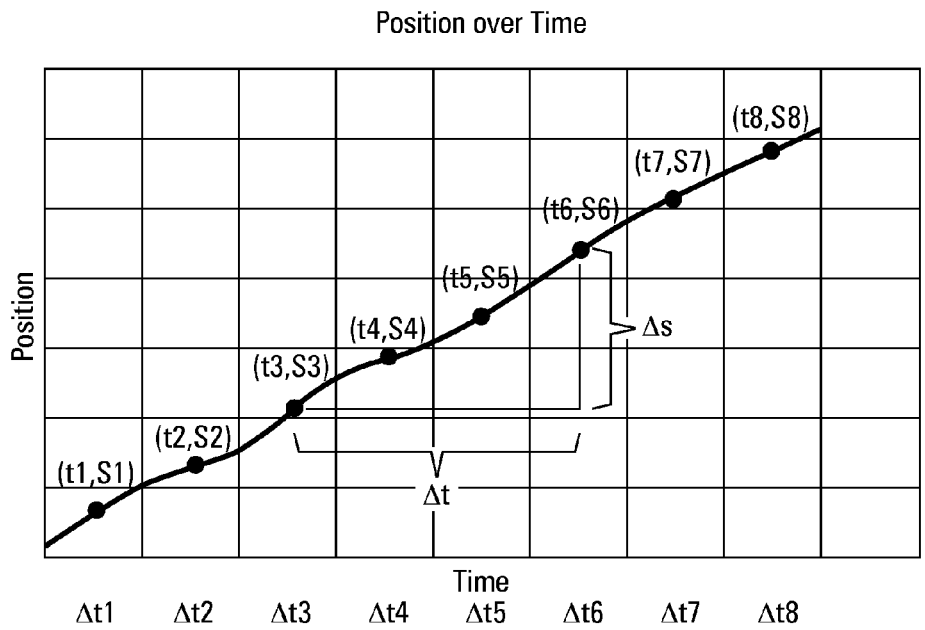
FIG. 12 is an exemplary chart of position over time.
Figure 13:
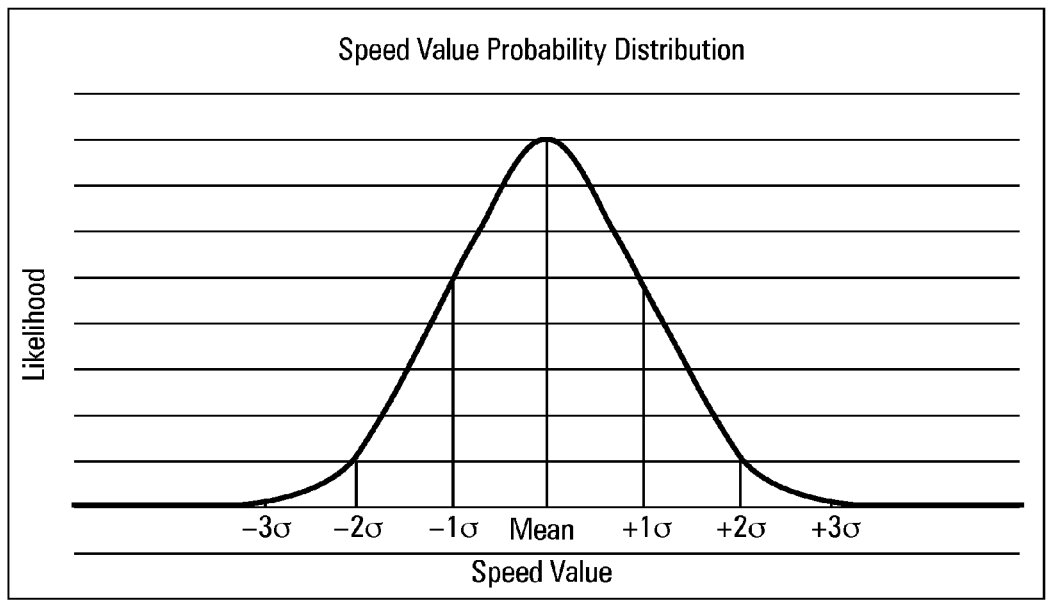
FIG. 13 is an exemplary chart of a speed value probability distribution.

In a preferred embodiment, the system captures and a position and timestamp forty times per second, or once every 25 milliseconds. These data points of a position and timestamp are grouped into 10-data point groups. In a perfect scenario, these would each encompass approximately one quarter second of time. In practice, as some data points are rejected for sparks or other anomalies, each time interval (i.e., $\Delta t_1$, $\Delta t_2$, etc. as seen in FIG. 12) is something likely greater than 0.25 seconds. The average value for both position and time for these 10 data points is calculated, and the average position (i.e., $s_1$, $s_2$, etc.) and average time (i.e., $t_1$, $t_2$, etc.) are determined for each time interval. Speed is now calculated by dividing the change in position between two average positions by the change in time between the two corresponding average times. In the preferred embodiment, the most recent time interval is compared to one three time intervals earlier.

In a preferred embodiment, the speed is presented to the user during the weld process. Speed is calculated over a four time interval window (current time interval and three earlier time intervals). This can be further filtered by the display system such that speed values are averaged over a longer interval, in a rolling average, so that timely feedback is provided, but smoothed enough to avoid confusing the user. In a preferred embodiment, six speed records are averaged to arrive at a displayed speed, resulting in a rolling average over the previous 1.5 seconds or more, at a 40 Hz sampling rate as described above.

Use of a Preferred Embodiment

This section describes the intended operation of a preferred embodiment only. Other embodiments or applications are foreseen which could modify the following description.

The welder 14 begins by preparing the weldment 11, which includes selecting and positioning appropriate metal pieces. The welder 14 will set up the welding equipment including adjusting parameters such as some combination of wire type, wire speed, voltage, current, and/or other settings as necessary to appropriately configure the equipment. The welder 14 will then turn on and position the speed sensor 10 above the weldment 11, ensuring that the sensors 28 are aimed at and are parallel to the weld joint 12. The welder 14 will turn on or apply power to the sensor array $28_n$. Through the user interface, the welder 14 can enter or select the desired welding parameters, which can take the form of a welding procedure specification (WPS), a common industry tool for specifying how a particular weld should be performed.

The welder 14 then performs the weld, while the speed sensor 10 collects data, calculates a speed, and transmits it to a user interface where it can be displayed to the welder 14 or saved for later review.

Once the weld is complete, the welder 14 can place another weldment 11 beneath the speed sensor 10 array and perform another weld.

I claim:

1. A light source locator, comprising (a) a series of normalized light intensity sensors spaced a known lateral distance apart and sensorially directed towards sequential line segments along a lateral path of travel, the sensors operable for generating a set of contemporaneous electronic signals including an electronic signal from each sensor indicative of the intensity of light emanating from a light source on the path of travel and sensed by the sensor, (b) electronic memory containing at least (i) spatial relationship data for the series of sensors including at least the lateral distance between sequential sensors, and (ii) a normalization factor for each sensor correlated to the sensor, and (c) a processor in communication with the series of sensors for receiving the electronic signal generated by each sensor, and in communication with the electronic memory, the processor operable for determining lateral location of a light source on the path of travel based upon the spatial relationship data, normalization factors and relative values of light intensity contemporaneously measured by at least some of the sensors.

2. The light source locator of claim 1 further comprising a portable frame configured to rest upon a surface with the series of sensors mounted upon a laterally extending beam supported by the frame a vertical distance above the surface.

3. The light source locator of claim 1 wherein the lateral path of travel is a linear path of travel.

4. The light source locator of claim 1 wherein the lateral path of travel is a curvilinear path of travel.

5. The light source locator of claim 1 wherein the lateral path of travel is defined by a joint on a weld test coupon.

6. The light source locator of claim 1 wherein the light source is a weld puddle.

7. The light source locator of claim 1 wherein the processor is programmed to determine lateral location of a light source on the path of travel at a given time based upon a normalized light intensity weighted average of light intensity values measured by at least the two adjacent light intensity sensors measuring the greatest normalized light intensity values at the given time.

8. The light source locator of claim 1 wherein the processor is programmed to determine lateral location of a light source on the path of travel at a given time based upon a normalized light intensity weighted average of light intensity values measured by at least the one light intensity sensor measuring the greatest normalized light intensity value at the given time and each light intensity sensor immediately adjacent the one light intensity sensor.

9. The light source locator of claim 1 wherein the processor is programmed to determine lateral location of a light source on the path of travel at a given time employing the equation:

$$\text{Position} = \frac{\sum_{k=1}^{n} \text{sensor value}(k) * \text{normalization factor}(k) * \text{position}(k)}{\sum_{k=1}^{n} \text{sensor value}(k) * \text{normalization factor}(k)}$$

wherein:
n=the number of light intensity sensors,
k=unique identifier for each light intensity sensor,
sensor value (k)=light intensity measurement made by light intensity sensor (k),
normalization factor (k)=normalization factor for light intensity sensor (k),
position (k)=lateral location of light intensity sensor (k) along the series of light intensity sensors.

10. The light source locator of claim 1 wherein the processor is programmed to reject an anomalous set of light intensity measurements, with an anomalous set of light intensity measurements identified as a set of light intensity measurements whose maximum, summed or average measured light intensity exceeds, by more than a previously determined threshold value, a corresponding maximum, summed or average measured light intensity obtained for at least one other contemporaneously obtained set of light intensity measurements.

11. The light source locator of claim 1 wherein the processor is programmed to reject an anomalous set of light intensity measurements, with an anomalous set of light intensity measurements identified as a set of light intensity measurements whose light intensity distribution graph has a shape that diverges, by more than a previously determined threshold value, from the shape of the light intensity distribution graph for at least one other contemporaneously obtained set of light intensity measurements.

12. A light source travel speed sensor, comprising (a) a series of normalized light intensity sensors spaced a known lateral distance apart and sensorially directed towards sequential line segments along a lateral path of travel, the sensors operable for generating sets of contemporaneous electronic signals over time with each set including an electronic signal from at least some of the sensors indicative of the intensity of light emanating from a light source on the path of travel sensed by the sensor, (b) an electronic timer operable for measuring time intervals between generation of sequential electronic signals, (c) electronic memory in communication with the timer for receiving and recording time intervals measured by the electronic timer, and containing at least (i) spatial relationship data for the series of sensors including at least the lateral distance between sequential sensors, and (ii) a normalization factor for each individual sensor correlated to the individual sensor, and (d) a processor in communication with the series of sensors for receiving the sets of electronic signals generated by each sensor, and in communication with the electronic memory, the processor operable for determining (i) lateral location of a light source on the path of travel for at least some of the sets of electronic signals based upon the spatial relationship data, normalization factors and relative values of light intensity measured by at least some of the sensors, and (ii) speed of travel of the light source along the path of travel based upon at least two determined lateral locations of the light source and the time interval between the at least two determined lateral locations of the light source.

13. The light source travel speed sensor of claim 12 further comprising a display in communication with the processor for displaying at least some of the determined speed of travel values.

14. The light source travel speed sensor of claim 12 wherein the lateral path of travel is defined by a joint on a weld test coupon.

15. The light source travel speed sensor of claim 12 wherein the light source is a weld puddle.

16. The light source travel speed sensor of claim 12 wherein the processor is programmed to determine lateral location of a light source on the path of travel at a given time based upon a normalized light intensity weighted average of light intensity values measured by at least the two adjacent light intensity sensors measuring the greatest normalized light intensity values at the given time.

17. The light source travel speed sensor of claim 12 wherein the processor is programmed to determine lateral location of a light source on the path of travel at a given time based upon a normalized light intensity weighted average of light intensity values measured by at least the one light intensity sensor measuring the greatest normalized light intensity value at the given time and each light intensity sensor immediately adjacent the one light intensity sensor.

18. The light source travel speed sensor of claim 12 wherein the processor is programmed to determine lateral location of a light source on the path of travel at a given time employing the equation:

$$\text{Position} = \frac{\sum_{k=1}^{n} \text{sensor value}(k) * \text{normalization factor}(k) * \text{position}(k)}{\sum_{k=1}^{n} \text{sensor value}(k) * \text{normalization factor}(k)}$$

wherein:
n=the number of light intensity sensors,
k=unique identifier for each light intensity sensor,
sensor value (k)=light intensity measurement made by light intensity sensor (k),
normalization factor (k)=normalization factor for light intensity sensor (k),
position (k)=lateral location of light intensity sensor (k) along the series of light intensity sensors.

19. A method of developing welding performance skills, comprising the steps of (a) obtaining a light source travel speed sensor in accordance with claim 12, (b) obtaining a welding machine that includes at least a welding power supply and a welding gun, (c) obtaining a welding coupon having a joint, (d) ascertaining a desired welding travel speed, (e) positioning the light source travel speed sensor and welding coupon relative to one another so that the joint on the welding coupon is coincident with the lateral path of travel towards which the light intensity sensors on the light source travel speed sensor are sensorially directed, (e) commencing manual welding of the joint on the welding coupon using the welding machine, thereby forming a weld puddle light source on the joint, (f) moving the weld puddle along the joint at a travel speed, (g) receiving information about the travel speed of the weld puddle light source determined by the light source travel speed sensor, and (h) adjusting the travel speed of the weld puddle as necessary to minimize any deviation between travel speed of the weld puddle and the desired welding travel speed.

20. The method of claim 19 wherein the step of receiving information about the travel speed of the weld puddle light source determined by the light source travel speed sensor, comprises the step of receiving information about the relative difference between the travel speed of the weld puddle light source determined by the light source travel speed sensor and the desired welding travel speed.

* * * * *

UNITED STATES PATENT AND TRADEMARK OFFICE
CERTIFICATE OF CORRECTION

PATENT NO. : 10,446,057 B2  
APPLICATION NO. : 15/511819  
DATED : October 15, 2019  
INVENTOR(S) : Jeremiah R. Bauer and Randy James Lee Page 1 of 1

It is certified that error appears in the above-identified patent and that said Letters Patent is hereby corrected as shown below:

On the Title Page

Item (12) should read: Bauer et al.

Item (72) Inventor add: "Randy James Lee, Ridgeland, WI".

Signed and Sealed this  
Second Day of June, 2020

Andrei Iancu  
*Director of the United States Patent and Trademark Office*